United States Patent Office 3,126,248
Patented Mar. 24, 1964

3,126,248
PROCESS FOR PRODUCING PURIFIED
CHLORINATED SILANES
Franz Arthur Pohl and Toni Hauskrecht, Belecke
(Mohne), Germany, assignors to Licentia Patent-
Verwaltungs-G.m.b.H., Hamburg, Germany
No Drawing. Filed Nov. 25, 1958, Ser. No. 776,207
Claims priority, application Germany Nov. 27, 1957
8 Claims. (Cl. 23—14)

This invention relates to a process for producing purified chlorinated silane, and more particularly to the production of monochloro-, dichloro-, trichlorosilane and completely chlorinated silane, i.e., silicon tetrachloride, free from borane, chlorinated boranes and/or boron trichloride.

This application is a continuation-in-part of our pending patent application Serial No. 730,524, filed April 24, 1958, now abandoned.

The use of elementary silicon in semiconductor arrangements such as rectifiers, photoelectric cells, transistors and other electrically, magnetically or light-controlled unsymmetrically conductive systems requires that the silicon be produced in a well defined crystallized state, preferably as monocrystals, and of an extreme degree of purity.

For this purpose, it is conventional in the art to obtain silicon of the desired purity by thermically decomposing silicon halides, in particular silicon tetrachloride, silicon chloroform, dichlorosilane, monochlorosilane and/or silane, in the presence of gaseous hydrogen and thus produce the elementary silicon in the form of crystal needles or as a powder. The conversion of the aforesaid silicon compounds to silicon can be carried out, for instance, as described by F. B. Litton and H. C. Anderson in "J. Electrochem. Soc." 101 (1954), pages 287–292, or by J. M. Wilson in "Research" 10 (1957), page 166.

After the silicon obtained by these decomposition processes has been brought into the desired polycrystalline or monocrystalline form, it still contains considerable amounts of impurities which do not permit its use for semiconductor purposes. Therefore, the silicon material is formed as rods and then subjected to repeated fusion and recrystallization in a zone which is caused to travel the length of the rod. This so-called "zone-refining" process is described by W. G. Pfann in "J. of Metals" (July 1952), pages 747–754, and by W. G. Pfann and K. M. Olsen in "Bell Lab. Rec." 33 (1955), pages 201–205.

However, all these measures are not sufficient to produce a crystalline silicon that fully satisfies the extreme degree of purity that is desired in the art of semiconductors.

In particular, it is not possible to remove boron from the silicon except to a very unsatisfactory degree. Since boron as an element of the third group of the Periodic Table of Mendelyeev is electrically active in silicon, it is not possible to determine the electrical properties of the silicon containing boron impurity centers in uncontrollable amounts and random distribution uniformly and with sufficient accuracy.

Moreover, very small amounts of boron in the order of $10^{-7}$ down to $10^{-8}$ percent per gram-atom of silicon cause noticeable electrical disturbances.

For this reason, a purification of partially or completely chlorinated silanes for the removal of boron by fractionated distillation based on the differences between the boiling points, the chlorinated silanes and borane, chlorinated boranes and/or boron trichloride is not sufficiently effective, the aforesaid difference amounting to only 20 to 70 degrees centigrade at atmospheric pressure; consequently even when a large portion of the borane, chlorinated boranes and/or boron trichloride has been eliminated in this manner, there are still boron impurities retained in greater amounts than are permissible in the use of the silicon as semiconductor material.

It is, therefore, an object of our invention to provide a process for producing a partially or completely chlorinated silane, which is exceptionally free from boron trichloride, borane and chlorinated borane impurities and therefore well suited as a starting material for the production of boron-free elementary, crystalline silicon for use in the semiconductor field.

This object is obtained by the process according to our invention which comprises the steps of (a) preparing a mixture of a chlorinated silane and an organic compound containing per molecule at least one atom carrying two "lone" electron pairs, of one of the two elements occupying the two lowest atomic numbers in Group VI of the Periodic Table of Mendelyeev, i.e., of either oxygen or sulfur, as a purifying agent, and (b) separating the chlorinated silane free from boron in the form of borane and/or chlorinated boranes including boron chlorides from the excess of the purifying agent and from addition compounds formed by the latter with borane, chlorinated boranes, and/or boron trichloride.

It shall be understood that the term "chlorinated silane" as used hereinafter in the specification and in the claims is meant to designate the group consisting of the partially as well as the completely chlorinated silanes, i.e.,., monochlorosilane $SiH_3Cl$, dichlorosilane $SiH_2Cl_2$, trichlorosilane or silicon chloroform $SiHCl_3$ and silicon tetrachloride $SiCl_4$.

"Lone electron pairs" are discussed, for instance, in Karrer, "Organic Chemistry," Fourth English Edition (1950), pages 65 and 66.

By the preparation of the aforesaid mixture of the lone-electron-pair carrier substance, acting as a purifying agent, with $BCl_3$, borane and/or chlorinated borane-containing chlorinated silane, borane, the chlorinated boranes and boron trichloride enter into thermically and chemically stable addition compounds with the carrier substance, which additive compounds have a much lower vapor pressure than the corresponding chlorinated silane while the purifying agent does not form compounds with the chlorinated silane itself.

Furthermore, the above described purifying agent should have a boiling point substantially different from the boiling point of the chlorinated silane.

Consequently, separating the chlorinated silane free from boron in the form of borane and chlorinated boranes or boron trichloride, as the case may be, from the excess of the purifying agent as well as from the aforesaid boron addition compounds, can be easily achieved by fractionated distillation.

The chlorinated silane purified according to the above described process contains no boron impurity that can be detected either with the well known methods of trace analysis or with the new greatly refined method described hereinafter. The content of borane and chlorinated boranes or boron trichloride in the purified chlorinated silane is, therefore, at least below $10^{-7}$ and preferably below $10^{-9}$ percent by weight.

While it has already been proposed in Patent 2,812,235 that substantial amounts of boron can be largely removed from chlorinated silanes with the aid of triphenylchloromethane and triphenylfluoromethane, we have discovered that a vastly superior purification effect can be achieved with a much more readily available and more economical group of substances which comprise:

I. Oxygen-containing organic compounds in the molecules of which the oxygen possesses two lone electron pairs: Aldehydes such as benzaldehyde $C_6H_5CHO$, ketones such as methylethylketone $CH_3.CO.C_2H_5$, oximes such as dimethylglyoxime

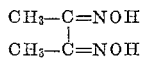

lactones such as valerolactone

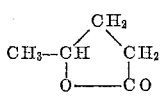

cyclic ethers such as dioxane

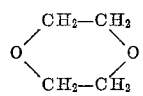

and nitrohydrocarbons such as nitrobenzene $C_6H_5NO_2$.

II. Sulfur-containing organic compounds in the molecules of which the sulfur possesses two lone electron pairs, such as thiophenol $C_6H_5SH$ and its derivatives, in particular its liquid homologues, and heterocyclic hydrocarbons such as the dimethylthiophenes, for instance, 2,4-dimethylthiophene

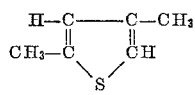

Comparative tests have shown that when 100 milliliters (ml.) of silicon tetrachloride or silicon chloroform containing 10 milligrams (mg.) of boron in the form of boron trichloride (i.e., about 113.5, mg. of the latter) are admixed with the tenfold molar amount of triphenylchloromethane and distilled, the first fractions separated from the mixture contain more than 10 micrograms ($\mu$g.) of boron trichloride per milliliter (ml.) of distilled fraction. We believe that this is due to a lack of stability of the addition compounds formed by the boron trichloride and triphenylchloro- or fluoromethane, and that this lack of stability is due to the fact that these addition compounds are not formed with a substance containing an oxygen or sulfur atom having two unshared electron pairs.

In contrast thereto, tests carried out with the same amount of silicon tetrachloride or silicon chloroform and boron trichloride but with the addition of a tenfold molar amount of a purifying agent according to the present invention revealed that the first fractions of the distilled mixture contained less than 0.1 $\mu$g. of boron per ml. of distillate. Purifying agents containing an oxygen or sulfur atom having two "lone" electron pairs therefore showed a performance which is at least one hundred times better than the purification obtained with the substances described in Patent 2,812,235.

The aforesaid compounds are characterized by the fact that the oxygen or sulfur atoms in their molecules possess two "lone" electron pairs forming part of the external electron shell of eight electrons surrounding the oxygen or sulfur atom in the above described classes of organic compounds. While the two other electron pairs constituting the octet of the aforesaid external shell each pertain to the oxygen or sulfur atom in common with one of the other atoms constituting the molecule in question and are, therefore, "shared" electron pairs, the third and fourth electron pairs are the above named "lone" or unshared pairs and pertain exclusively to the oxygen or sulfur atom itself. The theory of shared and lone, or unshared, electron pairs is further discussed in W. Hueckel, "Anorganische Strukturchemie" (1948), pages 66–90, published by F. Enke, Stuttgart, Germany, and by Fieser & Fieser, "Organic Chemistry," 1950, pages 8, 9, 18 and 19.

The two unshared electron pairs of the oxygen or sulfur atom present in the molecules of the groups comprising the above listed compounds are capable of forming an addition compound with the boron atoms in the borane, chlorinated borane, and/or boron trichloride molecules, whereby one of these electron pairs is shared by the boron atom and the oxygen or sulfur atom in an unpolar or covalent bond. Thereby the number of electrons in the outer electron shell of the boron atom is increased from six in the borane, chlorinated borane, or boron trichloride molecule to eight in the addition compound. As a result of this change in the electron shell of the boron atom, the planar character of the borane, chlorinated borane or $BCl_3$ molecule is changed to a tetrahedronal configuration in the addition molecule, in which the boron atom occupies the center, while the three hydrogen and/or chlorine atoms and the oxygen or sulfur atom of one of the above listed purifying agents occupy the four corners of the tetrahedron. The oxygen or sulfur atom contributing one of its "lone" electron pairs to this addition molecule is also termed the "donor" while the boron atom would be termed the "acceptor" and the bond between the purifying agent molecule on the one hand, and the borane, chlorinated borane or boron trichloride molecule on the other hand, may also be termed an "acceptor-donor bond."

We have further discovered that the purifying effect of the purifying agent, i.e., the donor molecule is the greater, the better the steric configuration of the donor molecule fits into the above described tetrahedronal addition molecule. This factor contributes to a higher thermal as well as chemical stability of the addition compound with $BCl_3$, borane and/or chlorinated boranes and correspondingly to a lower vapor pressure and improved separability from the chlorinated silane to be purified of these known impurities. This is particularly achieved when, on the one hand, the donor atom is of smaller atomic volume, as in the case of oxygen as the donor atom, and, on the other hand, the molecule containing the donor atom is not too large and therefore permits formation of a well balanced tetrahedronal system.

We assume that one of the reasons, why the known triphenyl methane derivatives mentioned hereinbefore are less suited for attaining the above stated goal, is the fact that their halogen atoms are very loosely bonded to the remaining part of the molecule (see Karrer, supra, page 401), and that the steric configuration of the triphenyl methyl chloride or fluoride molecule is such that it does not readily fit into the tetrahedron formed with the chlorine and/or hydrogen atoms of $BCl_3$, borane or chlorinated borane, but upsets the formation of a well balanced tetrahedron.

The formation of the tetrahedronal system consisting of the additive bonds of the purifying agent molecule to borane, chlorinated borane and/or $BCl_3$ is favored by having the addition reaction take place at a temperature range between $-150°$ C. and $+50°$ C., and more particularly between $-150°$ C. and $+20°$ C. in the case of partially, less chlorinated silanes and between $-70°$ C. and $+50°$ C. and preferably between $0°$ C. and $+20°$ C. in the case of highly or completely chlorinated silanes, i.e., in the case of $SiHCl_3$ and $SiCl_4$.

The mixture is then separated by distillating off pure chlorinated silane. The excess of the purifying agent having a boiling point much higher than the boiling point of chlorinated silane remains in the residue. The borane, chlorinated boranes and boron trichloride addition compound having a much lower vapor pressure than chlorinated silane at the boiling point of the chlorinated silane is also retained in the residue.

In the case of very low solubility of the borane, chlorinated borane or boron trichloride addition compound with the purifying agent in the chlorinated silane, the latter can be sucked off through a quartz frit into a quartz distillation apparatus and can then be separated from the excess of the purifying agent by fractionated distillation. In this case, the distilling flask and the silane or chlorinated silane in the latter must be cooled sufficiently deeply to maintain a sufficiently low vapor pressure of the silane and/or the chlorinated silane. The cooling must therefore be stronger than in the case of producing $BCl_3$-free silicon tetrachloride described in our co-pending application supra. Preferred temperatures range from $-80°$ C. to $-70°$ C. instead of $+20°$ C., if propionitrile is used as the purifying agent.

The chlorinated silane, however, can be separated from the mixture with the excess of most of the purifying agents adapted for use in the method according to the invention and the borane, chlorinated borane or boron trichloride addition compound by the simple way of distilling the pure chlorinated silane off and recollecting it.

According to a further mode of operation of the method according to the invention, the chlorinated silane obtained by the above described steps can be further processed to obtain a boron-free elementary silicon of the highest purity. To this end, the resultant chlorinated silane is decomposed in a closed reaction vessel under sufficiently strong heating, for instance, by indirect high frequency induction heating in an inert atmosphere, with or without high vacuum, and eventually in the presence of a reduction agent such as hydrogen. The elementary silicon being set free in this manner, is formed in the liquid state by deposition on a movable receptor body, the speed of movement of which receptor is so controlled, that the silicon is deposited in the formed liquid silicon and forms a solid, for instance, rod-shaped body as it is moved out of the heated zone in the apparatus.

Contact of the liquid silicon deposit with extraneous matter such as the walls of the reactor and the like, can be avoided by using as the receptor body a solid crystalline silicon ingot.

Some further details of this method of depositing silicon from the vapor phase are described, for instance, in the French Patent 1,125,277.

Purification may also be continued to remove impurities other than boron by repeated fusion and recrystallization by zone-refining as described by P. H. Keck in "Physica" 20 (1954), No. 11, pages 1059–1065. It becomes thus possible to obtain a silicon of substantially improved degree of purity.

Thus far, no chemical analyses for traces of boron are known to have a sufficient degree of sensitivity to determine $10^{-8}$ to $10^{-10}$ parts by weight of boron per part of silicon, since the reagents required in the known analytical methods such as sodium hydroxide contain boron impurities in higher concentrations than those mentioned above.

Electrical conductivity measurements employed for determining the amounts of boron present in silicon are equally unsatisfactory, since these methods can only determine total amounts of impurity centers present in silicon, and an actual amount of boron present may be disguised by the presence of other impurities of opposite conductivity.

The determination of the boron content in the chlorinated silane purified according to the method of our present invention, has been carried out with a new method described in "Actas do XV Congresso Internacional de Quimica Pura e Aplicada (Quimica Analitica) I, 30, Lisboa, 1956." The new method does not employ inorganic salts as reagents and thus avoids the contamination of the analytical reaction products with boron introduced with these salts.

According to the new method of boron determination in silicon, silicon crystals which have not been comminuted, are treated in an alalytical apparatus made of quartz, with hot bromine vapors. The silicon bromide thus obtained is hydrolyzed together with the boron bromide contained therein and then separated by percolation with methanol and isopropyl ether. The extracted boric acid is determined photometrically with curcumin. In this manner, $10^{-9}$ parts by weight of boron per part of silicon can be determined with an exactness of $\pm 10\%$.

Silicon crystals obtained from chlorinated silane purified according to the method of the present invention through the method described, for instance, in the following Example VIII, have been found, by the new analytical method mentioned above, to contain less than $10^{-9}$ parts of boron per part (by weight) of silicon. These extremely boron-free silicon crystals show an electrical resistivity of 500 to 2000 ohm-centimeters and a minority carrier life time from 200 to 1000 microseconds. These electrical characteristics had not been attainable in the past, and by any of the known methods.

The following examples in which the parts are by weight unless otherwise stated are illustrative of specific embodiments of the invention. It is to be understood that these examples are not intended as limitative.

*Example I*

1000 milliliters (ml.) of $SiCl_4$ produced in a conventional manner as described by L. Gattermann in "Berichte" 27 (1894), pages 1943 and the following, are poured into a quartz container having an opening that can be closed by a thread-connected lid. 1 ml. of dioxane

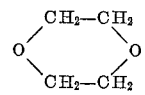

B.P. $102°$ C., is added thereto, the container is closed and shaken in an automatic shaker for one hour at a temperature of $+20°$ C. The boron trichloride contained as impurity in $SiCl_4$ is additively bonded to a part of the dioxane.

After the shaking step is terminated, the container is connected to a fractionating column, the mixture of the container is heated gradually, first to about $58°$ C. at which temperature $SiCl_4$ is distilled off. Then the excess of the purifying agent is recovered by distillation at about $102°$ C. The boron addition compound remains in the residue. 970 ml. of purified $SiCl_4$ are obtained.

An analysis for traces of boron is carried out with a test sample by means of the new extremely sensitive method of boron determination in silicon compounds. No traces of boron are found, which shows that less than $10^{-9}$ parts by weight of boron, if any, remains in the purified silicon tetrachloride.

*Example II*

Example I is repeated, using one part of isobutylmethylketone

B.P. $119°$ C., as the purifying agent for every 1000 parts by weight of silicon tetrachloride.

*Example III*

1000 parts by weight of silicon tetrachloride from the same source as in Example I are filled into a quartz container similar to that used in Example I together with 1 part by weight of dimethylglyoxime

B.F. $234.5°$ C., as the purifying agent, and then shaken for about 3 hours at a temperature of $+20°$ C.

After the shaking step is terminated, the silicon tetrachloride is sucked with the aid of a vacuum pump causing a weak depression through a quartz frit into a quartz distillation apparatus. By this way the excess of dimethylglyoxime with the boron addition compound are separated from silicon tetrachloride. After this step the silicon tetrachloride is distillated off. About 980 parts by weight of purified SiCl₄ are obtained.

*Example IV*

Example I is repeated, using one part of nitrobenzene

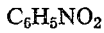

B.P. 210.9° C., as the purifying agent for every 1000 parts by weight of silicon tetrachloride.

*Example V*

Example I is repeated, using one part of valerolactone

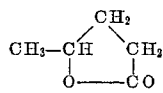

B.P. 206/7° C., as the purifying agent for every 1000 parts by weight of silicon tetrachloride.

*Example VI*

Example I is repeated under the same conditions, but using as a purifying agent one part of thiophenol

for 1000 parts by weight of silicon tetrachloride to be purified. Pure silicon tetrachloride is first distilled off as described in Example I, and the excess of thiophenol is then recovered by distillation at about 169.5° C.

*Example VII*

Example VI is repeated, however, with one part of 2,4-dimethylthiophene

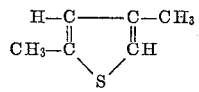

as the purifying agent. The excess of the latter is recovered by distillation at about 138° C.

*Example VIII*

This example illustrates the further processing of silicon tetrachloride purified from boron impurities by the method of the invention illustrated in the preceding examples. The purified silicon tetrachloride which is evaporated from the purification mixture, as described in any one of these examples, is then admixed to a stream of pure hydrogen and the mixture introduced into a quartz vessel The rate of flow of the hydrogen may be about 100 liters per hour. The ratio of admixture of silicon tetrachloride to hydrogen is preferably so adjusted that about 30 to 60 ml. for instance 40 ml., of silicon tetrachloride are evaporated per 100 liters of hydrogen. By this adjustment of the rate of flow of the gases at the inlet and outlet of the reaction chamber in the quartz vessel, it is possible to maintain either a slightly excess pressure or a slightly reduced pressure in that chamber. The excess of non-reacted hydrogen, the non-reacted portion of silicon tetrachloride, and the gaseous reaction products between the two gas components resulting from the reduction and decomposition of silicon tetrachloride, leave the chamber through the aforesaid outlet.

A rod-shaped silicon body having a diameter between 10 and 25 mm., for instance 15 mm., is arranged in the quartz vessel displaceably in the direction of the rod axis. At one end of the rod, which is preferably positioned vertically in the quartz vessel, heating by means of a high frequency emitter of about 2 to 5 kilowatts is effected to melt the tip of the rod by inductive heating. This can be achieved with a frequency higher than 100 kilocycles, for instance, of about 1 megacycle. The rod tip should consist of highly purified silicon. In the gas-filled space surrounding the liquified silicon rod tip, a thermic decomposition and reduction of silicon tetrachloride with the entraining hydrogen takes place. The elementary silicon thus formed from the silicon tetrachloride is incorporated in the liquid silicon tip.

Now, the silicon rod is removed out of the reaction space in axial direction at a velocity of about 0.1 to about 2 centimeters (cm.) per hour, for instance, in the present example at a velocity of 0.5 cm. per hour. The velocity of withdrawal is adjusted to the rate of silicon deposition on the liquid tip of the silicon rod, so that the volume of the liquid zone at the end of the rod remains substantially constant. Sealing means are provided where the cooled down silicon rod is withdrawn from the reaction chamber to the outside of the quartz vessel and can be cut off from the continuously growing silicon rod. In this manner it is possible to grow the silicon rod via its liquid tip, by about 2 grams (g.) of highly pure silicon per hour.

*Example IX*

The highly pure silicon obtained according to the preceding example can then be further purified by zone-refining in the following manner. This zone-refining treatment is carried out in an evacuated quartz tube which is surrounded at one zone by a high frequency heating device. A rod-shaped silicon body is disposed coaxially with the axis of the quartz tube in the interior of the latter and is supported displaceably at its two ends. With the aid of the aforesaid high frequency device, a transverse zone of the silicon rod is molten, however, while maintaining the coherence of the rod surface. The silicon rod is now moved in axial direction so that the molten zone moves from one of the rods toward the other. This process may be repeated several times. By this treatment, a re-distribution of impurities other than boron that may eventually still be present in the silicon, takes place at the border zone between the molten zone and the solidifying portion of the rod; i.e., that part of the rod that is leaving the melting zone. Those impurities which have a distribution coefficient smaller than 1 are thereby accumulated in the liquid zone and are moved due to the translation of the molten zone through the rod toward the one end of the silicon rod.

For instance, a rod-shaped silicon body having a diameter of 10 to 30 mm., and in the present instance 15 mm., as obtained by the preceding example, can be subjected to the above described zone-refining. The high frequency inductive heating device may operate with an output of 2 to 10 kilowatts and at frequencies higher than 100 kilocycles. The width of the molten zone may be of 10 to 20 mm., for instance, 15 mm., while its diameter is, of course, equal to that of the rod.

*Example X*

1000 parts by weight of SiHCl₃ produced in a conventional manner as described by O. Ruff and K. Albert, Berichte 38 (1905), pages 2226 and the following, and by A. Stock and C. Somieski, Berichte 49 (1916), page 111, are poured into a quartz container having an opening that can be closed by a thread-connected lid. 1 part by weight of dioxane

B.P. 102° C., are added thereto, the container is closed and shaken in an automatic shaker for one hour at a temperature of −50° C. The chlorinated borane contained as impurity in SiHCl₃ are additively bonded to a part of the dioxane.

After the shaking step is terminated, the container is connected to a fractionating column, the mixture of the container is heated to 33° C. at which temperature SiHCl₃ is distilled off. The boron addition compound remains in the residue.

An analysis for traces of boron is carried out with a test sample by means of the new extremely sensitive method of boron determination in silicon compounds.

No traces of boron are found, which shows that less than 10⁻⁹ parts by weight of boron, if any, remains, in the purified silicon chloroform.

*Example XI*

One part by weight of methylethylketone (CH₃.CO.C₂H₅)

B.P. 79.6° C., is added to 1000 parts by weight of monochlorosilane, SiH₃Cl, in a quartz flask at a temperature of between about —70° C. and about —80° C., and the mixture is shaken for one hour, for instance in a mechanical shaking device. The quartz flask is closed with a ground-in stopper which is provided with a calcium chloride tube in order to equalize pressure. After the shaking is terminated, the quartz flask is connected to a distilling apparatus and the pure monochlorosilane is distilled off under atmospheric pressure at its boiling temperature of —30° C.

*Example XII*

1000 parts by weight of silicon chloroform from the same source as in Example I are filled into a quartz container similar to that used in Example I together with 1 part by weight of dimethylglyoxime

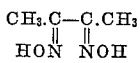

B.P. 234.5° C., as the purifying agent, and then shaken for about 3 hours at a temperature of —5° C.

After the shaking step is terminated, the silicon chloroform is sucked with the aid of a vacuum pump causing a weak depression through a quartz frit into a quartz distillation apparatus. By this way the excess of dimethylglyoxime with the boron addition compound are separated from silicon chloroform. After this step the silicon chloroform is distilled off. About 980 parts by weight of purified SiHCl₃ are obtained.

*Example XIII*

One part by weight of nitrobenzene C₆H₅NO₂, B.P. 210.9° C., is added to 1000 parts by weight of dichlorosilane, SiH₂Cl₂, in a quartz flask at a temperature of between —50° C. and about —60° C., and the mixture is shaken for one hour, for instance, in a mechanical shaking device. The quartz flask is closed with a ground-in stopper which is provided with a calcium chloride tube in order to equalize pressure. After the shaking is terminated, the quartz flask is connected to a distilling apparatus and the pure dichlorosilane is distilled off under atmospheric pressure at its boiling temperature of +8.3° C. The boron addition compound is remaining in the residue. No traces of boron are found by a test with the new and extremely sensitive method of boron determination in silicon compounds, which shows that less than 10⁻⁹ parts by weight of boron, if any, remains in the purified dichlorosilane.

*Example XIV*

Example I is repeated, using one part of valerolactone

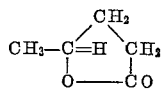

B.P. 206/7° C., as the purifying agent for every 1000 parts by weight of silicon chloroform.

*Example XV*

Example I is repeated under the same conditions, but using as a purifying agent one part of thiophenol

for 1000 parts by weight of silicon chloroform to be purified. Pure silicon chloroform is distilled off as described in Example I.

*Example XVI*

One part by weight of benzaldehyde C₆H₅CHO is added to 1000 parts by weight of monochlorosilane, SiH₃Cl, in a quartz flask at a temperature of between about —70° C. and about —80° C., and the mixture is shaken for one hour, for instance in a mechanical shaking device. The quartz flask is closed with a ground-in stopper which is provided with a calcium chloride tube in order to equalize pressure. After the shaking is terminated, the quartz flask is connected to a distilling apparatus and the pure monochlorosilane is distilled off under atmospheric pressure at its boiling temperature of —30° C.

*Example XVII*

Example XV is repeated, however, with one part of 2,4-dimethylthiophene

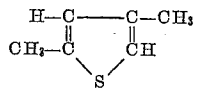

as the purifying agent. The excess of the latter is recovered by distillation at about 138° C.

*Example XVIII*

This example illustrates the further processing of a partially chlorinated silane, for instance silicon chloroform purified from boron impurities by the method illustrated in the preceding examples. The purified silicon chloroform which is evaporated from the purification mixture, as described in any one of these examples, is treated further as described, in the case of silicon tetrachloride, in Example VIII.

*Example XIX*

The highly pure silicon obtained according to the preceding example can then be further purified by zone-refining in the manner described in Example IX.

It will be understood that while there have been given herein certain specific examples of the practice of this invention, it is not intended thereby to have this invention limited to or circumscribed by the specific details of materials, proportions or conditions herein specified, in view of the fact that this invention may be modified according to individual preference or conditions without necessarily departing from the spirit of this disclosure and the scope of the appended claims.

What is claimed is:

1. A process for producing an at least partially chlorinated silane substantially free of impurities of borane, chlorinated borane and boron trichloride comprising the steps of: adding to an at least partially chlorinated silane containing at least one of the boron-containing impurities, an excess of a purifying agent being an organic compound selected from the group consisting of dioxane, benzaldehyde, methyl ethyl ketone, dimethyl glyoxime and valerolactone; reacting said boron-containing impurities present in the at least partially chlorinated silane with a portion of said organic compound to form an addition compound; and separating from the reaction mixture containing said at least partially chlorinated silane, said addition compound and said excess of organic compound, an at least partially chlorinated silane substantially free from borane, chlorinated borane, and boron trichloride.

2. The process of claim 1 wherein the reaction between said boron containing impurities present in the at least partially chlorinated silane is conducted at a temperature between —150° C. and +50° C.

3. The process of claim 1 wherein the at least partially chlorinated silane substantially free from boron-containing impurities is separated from the reaction mixture by distillation.

4. The process of claim 1 wherein the purifying agent is benzaldehyde.

5. The process of claim 1 wherein the purifying agent is methyl ethyl ketone.

6. The process of claim 1 wherein the purifying agent is dimethyl glyoxime.

7. The process of claim 1 wherein the purifying agent is valerolactone.

8. The process of claim 1 wherein the purifying agent is dioxane.

References Cited in the file of this patent

UNITED STATES PATENTS

| | | |
|---|---|---|
| 2,378,968 | Axe | June 26, 1945 |
| 2,768,074 | Stauffer | Oct. 23, 1956 |
| 2,812,235 | Winslow | Nov. 5, 1957 |
| 2,857,249 | Wolff | Oct. 21, 1958 |
| 2,947,607 | Pohl | Aug. 2, 1960 |

FOREIGN PATENTS

| | | |
|---|---|---|
| 486,563 | Great Britain | June 7, 1938 |
| 501,670 | Great Britain | Mar. 3, 1939 |
| 656,098 | Great Britain | Aug. 15, 1951 |
| 745,698 | Great Britain | Feb. 29, 1956 |

OTHER REFERENCES

Gerrard et al.: "Chemical Reviews," vol. 58, pp. 1095–1099, 1958.

Gerrard et al.: "Journal of the Chemical Society," 1960, pp. 2141–2144.

Holliday: "Journal of the Chemical Society," 1952, pp. 11–13.

Edwards et al.: "Journal of the Chemical Society," 1955, pp. 1470–1475.

Frazer et al.: "Journal of the Chemical Society," 1957, p. 739.

Greenwood et al.: "Quarterly Reviews," vol. 8, p. 18 (1954).

Richter: "Organic Chemistry," 2nd ed., 1943, pp. 104–105.